United States Patent [19]

Nix

[11] Patent Number: 5,365,542
[45] Date of Patent: Nov. 15, 1994

[54] ANODE FOR A DIRECT CURRENT ARC FURNACES

[75] Inventor: Edgar Nix, Ratingen, Germany

[73] Assignee: Deutsch Voest-Alpine Industrieanlagenbau GmbH, Dusseldorf, Germany

[21] Appl. No.: 124,364

[22] Filed: Sep. 20, 1993

Related U.S. Application Data

[63] Continuation of Ser. No. 917,453, Jul. 21, 1992.

[30] Foreign Application Priority Data

Aug. 12, 1991 [DE] Germany .............................. 4126627

[51] Int. Cl.[5] ............................................ H05B 7/22
[52] U.S. Cl. ................................. 373/64; 373/65; 373/72; 373/108
[58] Field of Search .................. 373/60, 61, 62, 64, 373/65, 72, 85, 108

[56] References Cited

U.S. PATENT DOCUMENTS

| | | | |
|---|---|---|---|
| 4,204,082 | 5/1980 | Stenkvist | 373/72 |
| 4,324,943 | 4/1982 | Stenkvist et al. | 373/72 |
| 4,336,411 | 6/1982 | Hanas et al. | 373/85 |
| 4,528,673 | 7/1985 | Stenkvist | 373/108 |
| 4,541,099 | 9/1985 | Rappinger et al. | 373/72 |
| 4,577,326 | 3/1986 | Bergman et al. | 373/103 |
| 4,606,055 | 8/1986 | Lassander et al. | 373/108 |
| 4,618,963 | 10/1986 | Rappinger et al. | 373/72 |
| 5,052,018 | 9/1991 | Meredith | 373/72 |
| 5,138,629 | 8/1992 | Maki et al. | 373/64 |
| 5,138,630 | 8/1992 | Suga | 373/107 |

FOREIGN PATENT DOCUMENTS

| | | | |
|---|---|---|---|
| 3817381 | 11/1989 | Germany . | |
| 2143110 | 1/1985 | United Kingdom | 373/72 |

Primary Examiner—Bruce A. Reynolds
Assistant Examiner—Tu Hoang

[57] ABSTRACT

An anode for a direct current arc furnace is proposed, in which at least part of the area of the furnace receiving the melt is provided on the inside with an electrically conductive refractory lining, which is electrically connected to the conductor located on the outside and in which a cathode is positioned vertically above the melt. The electrically conductive lining (3, 4; 9) and/or the conductor (1, 8) have varying values with respect to their electrical characteristics in the circumferential direction relative to the vertical axis of the cathode (2; 11), so that there is a planned, asymmetrical current distribution on the furnace bottom.

7 Claims, 1 Drawing Sheet

ANODE FOR A DIRECT CURRENT ARC FURNACES

This application is a continuation of application Ser. No. 07/917,453, filed Jul. 21, 1992.

BACKGROUND OF THE INVENTION

The invention relates to an anode for a direct current arc furnace.

EP 422 406 discloses an anode for a d.c. arc furnace, in which the area of the furnace which receives the melt is provided with an electrically conductive refractory lining and on whose outside is electrically conductively applied an annular or cylindrical conductor.

Apart from the conductor, which is preferably a copper ring, the anode comprises several layers made from materials with different characteristics. The layer in direct contact with the melt is formed from an electrically conductive, refractory material, such as e.g. carbon-magnesite in areas not coming into contact with the melt, the lining is made from graphite bricks, which have a much better conductivity than carbon-magnesite.

The entire layer structure and also that of the conductor surrounding the furnace are rotationally symmetrical, so that in the radial direction a relatively homogeneous electric flow field is built up. The resulting magnetic field keeps the arc in a central position.

With this anode construction for a d.c. arc furnace a uniform temperature distribution of the melting stock is ensured, unless magnetic fields located outside the furnace vessel and which an e.g. be caused by the provision of supply or leakage cables, disturb this symmetry and deflect the arc in an undesirable manner.

It is also not possible to heat more strongly in planned manner certain areas of the melt, such as is e.g. necessary in the case of bottom tapped furnaces. It is also not possible to influence in a desired manner the movement in the molten bath.

it is known from DE-OS 40 35 233 to compensate the arc deflection caused by magnetic fields located outside the furnace vessel by additional magnetic fields produced by current-carrying conductors located on the furnace bottom.

DE-OS 34 23 677 discloses a d.c. arc furnace, in which particular importance is attached to the symmetrical design of the bottom electrode serving as the anode. In this furnace the power supplies from the rectifier to the bottom electrode are arranged symmetrically. This arrangement was chosen in order to prevent any influence on the formation of the magnetic field, which would have a negative influence on its symmetry and therefore being about a deflection of the arc.

The solutions described in the two aforementioned publications suffer from important disadvantages, because they involve considerable electrical equipment expenditure.

SUMMARY OF THE INVENTION

The problem of the present invention is to bring about, at limited cost, a locally planned heating of the molten bath and achieve clearly defined movements within the melt, whilst compensating any undesired influence of larger magnetic fields on the arc.

As a result of the circumferentially changing electrical characteristics of the conductive lining and/or the conductor of the inventive anode, there is a planned influencing of the current distribution and therefore the formation of the magnetic field. It is particularly advantageous in the case of an eccentric bottom tap, if the areas which are positioned opposite to the taphole with respect to the cathode axis have a lower electrical resistance and consequently a higher current passage, so that the arcing zone, emanating from the cathode, is deflected in the direction of said taphole and consequently the melt is heated ore in this area than in other areas. If the arc is to pass in the direction of the cathode axis, but would be deflected out of this direction by an external magnetic field in the case of a symmetrical anode arrangement, then as a result of a corresponding asymmetrical arrangement of the anode the influence of said magnetic field on the arc could be compensated. Therefore the arc can run concentrically to the cathode axis or can be deflected in desired manner relative thereto.

It is also possible to form the entire electric flow field of the anode in such a way that desired flow movements are produced in the molten bath, so that to a certain extent the bath is agitated.

The inventive anode can be constructed in several different ways. It is firstly possible to have the anode cross-section or conductivity such, that the electric flow field is built up in a desired manner and the arc is deflected, e.g. towards the taphole. A second possibility consists of subdividing the above circumferentially into several segments, which are not directly electrically interconnected. These segments are than distributed asymmetrically and in desired manner over the furnace circumference. Therefore a larger gap between the segments on the side having the eccentrically positioned taphole or a cold zone located there for various reasons and which has to be eliminated, is suitable for deflecting the arc towards this side.

The parts of the anode located in the interior of the furnace made from electrically conductive material can be combined in different ways in order to achieve the desired effect. Thus, it is possible to vary the materials used, e.g. in that when using carbon-magnesite the carbon proportion is increased or decreased. Therefore the bricks of the electrically conductive refractory lining, which, with respect to the cathode axis, are positioned opposite to the desired arc deflection, have a higher carbon proportion than those on the side of the deflection.

It is also possible in place of bricks having a higher carbon proportion, to line with graphite bricks part of the lining not indirect contact with the melt. It is possible in this case to additionally influence the electric flow field via the different height of said lining part.

In order to influence the melt movement in planned manner, adjacent areas of the anode can have different electrical resistances, so that the flow field strength differences influence the movement.

DESCRIPTION OF THE PREFERRED EMBODIMENTS

Figure 1:
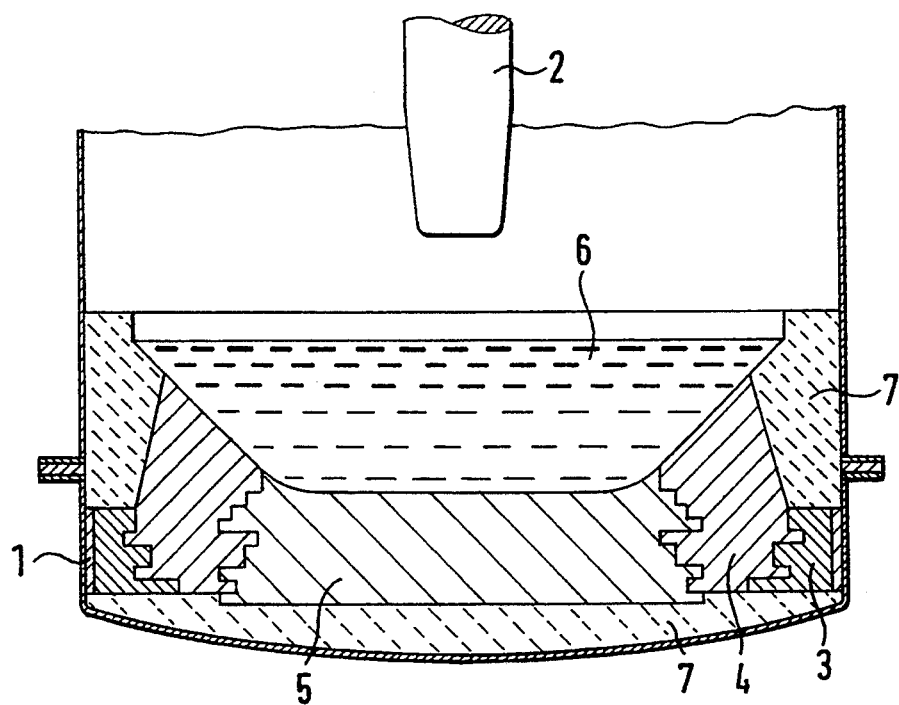
FIG. 1 A diagrammatic sectional representation of a direct current arc furnace according to a first embodiment.

The arc furnace according to FIG. 1 has an annular, copper conductor 1, which forms part of the anode. A vertically extending cathode 2 adjustable in this direction is positioned centrally above the melt 6. On the preferably steel bottom part is provided a refractory, insulating lining 7. An annular part of the lining formed from graphite bricks 3 is provided on the conductor 1 in a direct electrically conductive connection therewith. To this annular part formed from graphite bricks 3 is connected a further part of the lining formed from electrically conductive refractory material 4. Both these parts are interconnected. The area of the lining made from electrically conductive refractory material 4 is also annular and is preferably constituted by carbon-magnesite bricks.

In the central area of the furnace coming into direct contact with the melt 6 is provided a ramming mass 5, which is preferably mainly constituted by magnesite. By a toothed construction of the electrically conductive, refractory lining 4 in the direction of the central furnace area and which is formed by the monolithic ramming mass 5, there is an intimate connection of these two areas.

During the operation of the arc furnace, an arc is formed between the cathode 2 and the melt 6 and is e.g. intended to pass in the direction of the cathode axis, but is deflected therefrom by an external magnetic field. To compensate this deflection the anode is constructed in such a sway that its electrical characteristics change circumferentially, i.e. the current flowing over the anode has a circumferentially varying intensity, which leads to an asymmetrical current distribution with respect to the cathode axis. As a result of this asymmetry the arc is deflected to the side which, with respect to the cathode axis, is opposite to the side on which the current through the anode has the greatest intensity. Thus, an existing arc deflection can be compensated in such a way that it again passes in the direction of the cathode axis. However, as a result of the asymmetrical current distribution, the arc can also be deflected in a desired direction and any deflection must be taken into account by an external magnetic field. In the case of the arc furnace according to FIG. 1, the asymmetrical current distribution is obtained in that the resistance values of the conductor 1 and/or the lining of graphite bricks 3 and/or the lining of electrically conductive refractory material 4 change in the circumferential direction.

Figure 2:
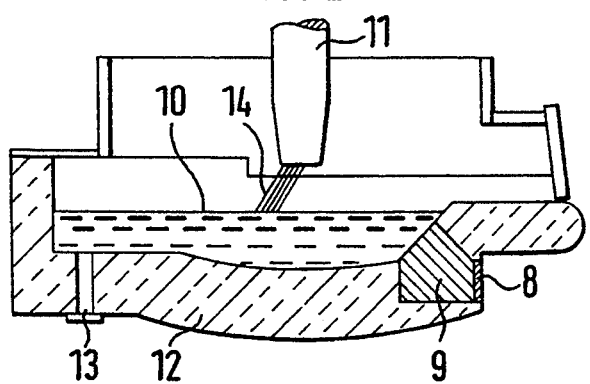
FIG. 2 A diagrammatic sectional representation of a second embodiment of a d.c. arc furnace with an eccentric bottom tap.
Figure 3:
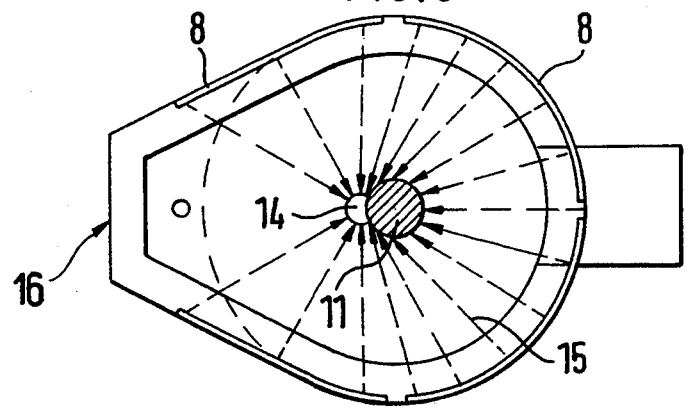
FIG. 3 A sectional representation of the furnace according to FIG. 2 from above.

The arc furnace according to FIGS. 2 and 3 has an anode formed from a copper conductor 8 and a lining of electrically conductive refractory material 9, which by means of graphite bricks (not shown in FIG. 2) is electrically connected on the one hand to the conductor 8 and on the other to the melt 10, a cathode 11 and a lining of electrically insulating refractory material 12. By means of a bottom taphole 13, which can be closed in not shown manner and which is arranged eccentrically relative to the vertical furnace axis, which coincides with the cathode axis, at appropriate time intervals the melt 10 can be drawn off.

As a result of the eccentric arrangement of the taphole 13, it is appropriate to deflect the arc 14 towards it. Such a deflection is obtained by influencing the formation of the electric flow field, in that on the arc furnace side opposite to the cathode axis the lining of electrically conductive refractory material 9 has a much lower electrical resistance than on the side where the taphole 13 is located. Therefore the deflected arc 14 (arcing zone) heats the melt 10 in the vicinity of the taphole 13 to a greater extent than in other areas, which leads to favourable tapping conditions.

In the case of this furnace, the electrical flow field formation in additionally influenced in that the conductor 8 on the side opposite to the taphole 13, by means of the graphite bricks has a much larger contact surface with the lining of electrically conductive refractory material 9 than on the side on which the taphole 13 is located. It is advantageous for the conductor 8 to be in the form of several circumferentially succeeding segments, which are arranged in such a way that there is a larger gap in the area 16 closest to the taphole 13.

It can be gathered from FIG. 3, which a sectional representation from above of a d.c. arc furnace, that the segments of the anode and therefore the conductivity thereof with respect to the axis of the cathode 11 are asymmetrical and consequently the electrical flow field is influenced in such a way that the arcing zone of the arc 14 is deflected towards the taphole 13 relative to the vertical axis of the cathode 11. To make understanding easier flow lines 15 are shown with different thickness to make clear the formation of the field. Thus, it is possible through the construction of the anode to deflect the arc 14 so far in the direction of the taphole 13, that the melt 10 more particularly is heated in the area around it and consequently a reliable tapping of the melt 10 is ensured.

We claim:

1. Anode for a direct current arc furnace, in which at least part of a furnace area receiving the melt is provided on the inside with an electrically conductive refractory lining, which is electrically connected to an annular copper conductor located on the outside of the furnace and in which a vertically-oriented cathode is arranged above the melt, wherein the electrically conductive lining has values for its electrical resistivity which change circumferentially with respect to the vertical axis of the cathode to thereby provide a lower electrical resistance on a side of the furnace opposite to an eccentrically arranged taphole.

2. Anode according to claim 1, wherein the material for the electrically conductive lining is a carbon-magnesite with carbon proportion which changes circumferentially with respect to the vertical axis of the cathode.

3. Anode according to claim 1, wherein areas of the electrically conductive refractory lining not in direct contact with the melt comprises graphite bricks and between the graphite bricks there are gaps in the circumferential direction which gaps are filled with a non-graphite refractory material.

4. Anode according to claim 1, wherein the electrical resistance differs zonally over the circumference of the furnace.

5. Anode according to claim 1, wherein the conductor comprises circumferentially succeeding segments of varying lateral size, the segments having gaps of varying size therebetween, the gaps being arranged asymmetrically with respect to the vertical axis of the cathode.

6. Anode according to claim 1, wherein the resistivity of the electrically conductive lining varies axially with respect to the vertical axis of the cathode.

7. Anode according to claim 5, wherein the conductor has a gap in the area closest to the taphole.

* * * * *